United States Patent [19]

Chervenak et al.

[11] 4,221,653
[45] Sep. 9, 1980

[54] CATALYTIC HYDROGENATION PROCESS AND APPARATUS WITH IMPROVED VAPOR LIQUID SEPARATION

[75] Inventors: Michael C. Chervenak, Pennington; Alfred G. Comolli, Trenton, both of N.J.

[73] Assignee: Hydrocarbon Research, Inc., Lawrenceville, N.J.

[21] Appl. No.: 920,825

[22] Filed: Jun. 30, 1978

[51] Int. Cl.² .................... C10G 1/00; C10G 1/08
[52] U.S. Cl. .................... 208/8 LE; 208/11 LE; 208/10; 422/140
[58] Field of Search .............. 208/8 LE, 11 LE, 10; 422/140

[56] References Cited

U.S. PATENT DOCUMENTS

| RE. 25,770 | 4/1965 | Johanson | 208/10 |
|---|---|---|---|
| 3,124,518 | 3/1964 | Guzman et al. | 208/143 X |
| 3,227,528 | 1/1966 | Jager | 208/143 X |
| 3,414,386 | 12/1968 | Mattix | 422/140 X |
| 3,677,716 | 7/1972 | Weber et al. | 422/140 |
| 4,057,397 | 11/1977 | Gross et al. | 422/140 |
| 4,097,243 | 6/1978 | Bartholic | 422/140 |

Primary Examiner—Delbert E. Gantz
Assistant Examiner—William G. Wright
Attorney, Agent, or Firm—Michael A. Jacobs

[57] ABSTRACT

A continuous hydrogenation process and apparatus wherein liquids are contacted with hydrogen in an ebullated catalyst reaction zone with the liquids and gas flowing vertically upwardly through that zone into a second zone substantially free of catalyst particles and wherein the liquid and gases are directed against an upwardly inclining surface through which vertical conduits are placed having inlet ends at different levels in the liquid and having outlet ends at different levels above the inclined surface, such that vapor-rich liquid is collected and discharged through conduits terminating at a higher level above the inclined surface than the vapor-poor liquid which is collected and discharged at a level lower than the inclined surface.

15 Claims, 8 Drawing Figures

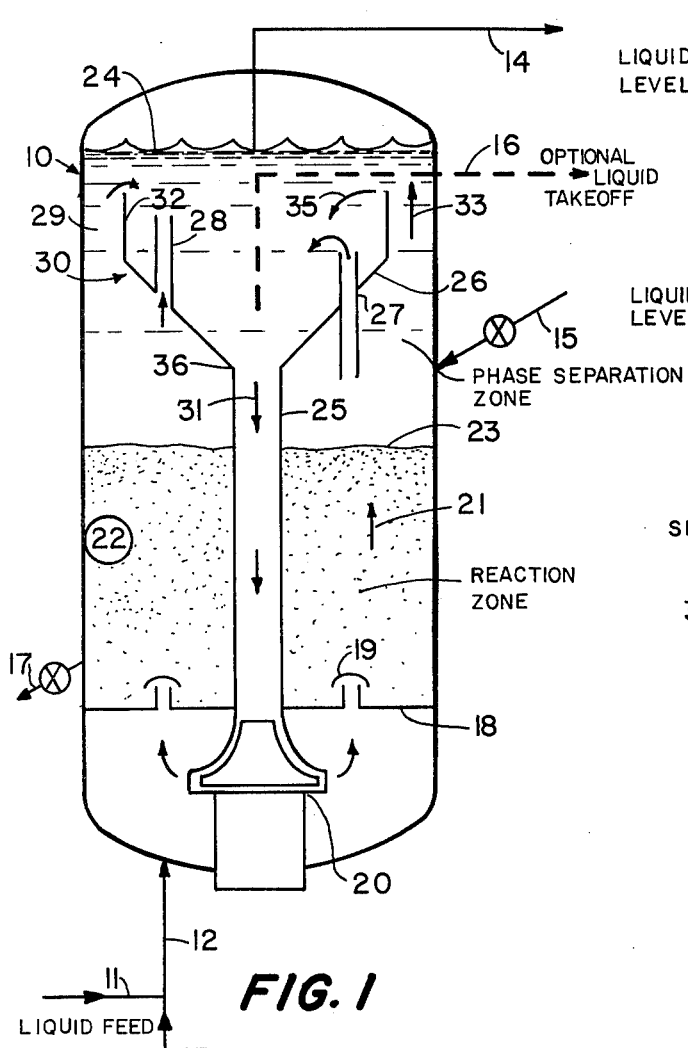
FIG. 1
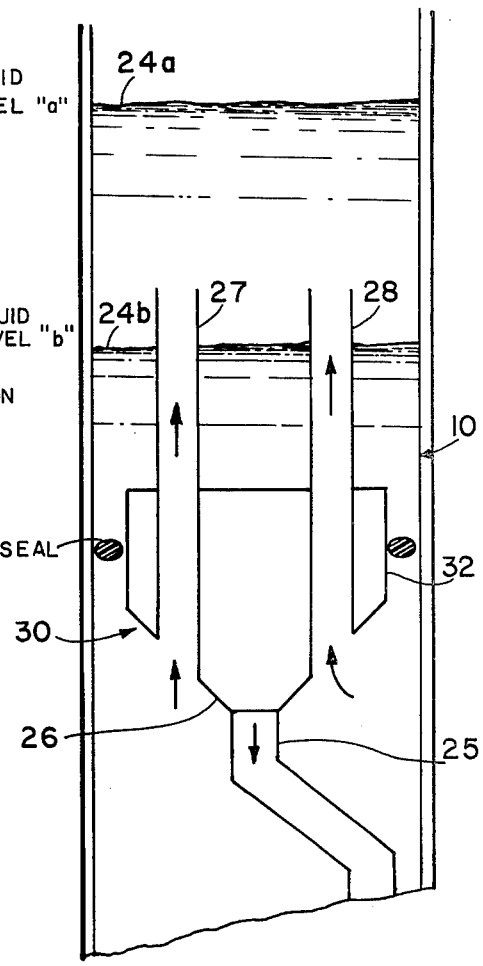
FIG. 6
FIG. 5
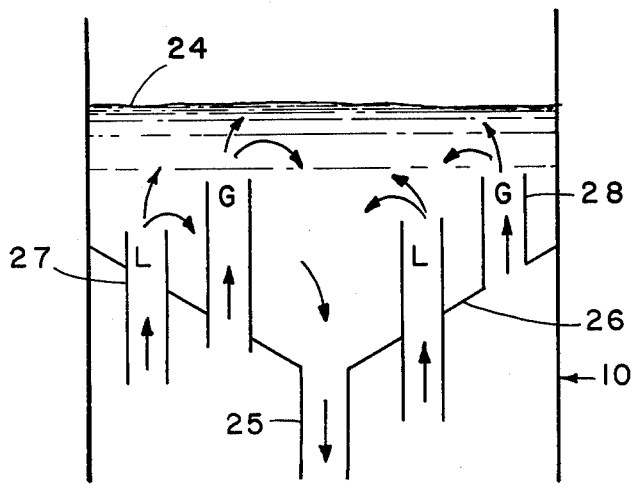

CATALYTIC HYDROGENATION PROCESS AND APPARATUS WITH IMPROVED VAPOR LIQUID SEPARATION

BACKGROUND OF THE INVENTION

The present invention is directed to an improved method and apparatus for chemically reacting liquids or slurries of liquids and solids with gasiform materials by the "ebullated bed process." The ebullated bed process generally comprises passing concurrently flowing streams of liquids or slurries of liquids and solids and gasiform materials through a generally cylindrical vessel which contains a mass of particulate contact material. The mass of contact particles is placed in random motion in the liquid medium, and has a gross volume dispersed through the liquid medium greater than the volume of the mass when stationary. This technology has found commercial application in the upgrading of heavy liquid hydrocarbons or converting coal to synthetic oils.

The process is generally described in U.S. Pat. No. Re 25,770 to Johanson, with particular reference to coal and oil conversion. A mixture of hydrocarbon liquid and hydrogen is passed upwardly through a bed of catalyst particles at a rate such that the particles are placed into random motion as the liquid and gas are passed upwardly through the bed, and the catalyst bed motion is controlled by a recycle liquid flow such that the majority of the catalyst particles do not rise above a certain level in the reactor. The liquid which is being hydrogenated along with the vapors present in the reaction pass through that upper level of catalyst particles and are removed from the upper portion of the reactor.

In the normal operation of such a system, there are substantial amounts of hydrogen gas and light hydrocarbon vapors which rise through the reaction zone into the liquid section from which the liquid is either recycled to the bottom of the reactor or forms liquid effluent. The presence of gases and vapors in the recycle stream present a separation problem, since a liquid portion recycled to the bottom of the reactor passes through a pump which must be carefully controlled in order to maintain the expansion and random motion catalyst particles at a constant and stable level. Any gases or vapors present in the recycled liquid materially decrease the capacity and efficiency of the recycle pump as well as the flow pattern and thus decrease the stability of the ebullated bed.

Typically, the reactors employed in catalytic hydrogenation processes using ebullated beds of catalyst particles are designed with a central vertical conduit which serves as the downcomer for recycling clear liquid from above the level of the ebullated catalyst bed to the suction of a recycle pump for recirculating the liquid through the catalytic reaction zone. The recycling of material from the upper portion of the reactor serves to ebullate the catalyst bed, maintain the temperature uniformly throughout the reactor, and stabilize the catalyst bed.

One prior art method for effective gas-liquid recycle is shown in U.S. Pat. No. 3,124,518 to Guzman, which discloses a downcomer fitted with a large entrance cone or funnel having a maximum cross-sectional area of approximately ½ that of the entire reaction zone. This permits the velocity of the liquid to slow relative to the gas, so the gas which is entrained in the liquid can have an opportunity to separate from the liquid and rise to the liquid-gas interface above the cup, prior to recycling the liquid.

Another prior art recycle device is disclosed in U.S. Pat. No. 3,227,528 to Jaeger which shows a recycle conduit similar to that of Guzman, except that it is connected to a pump.

Another reactor configuration for such gas-liquid separation is disclosed in U.S. Pat. No. 3,414,386 to Mattix, which discloses a reactor having a conical-shaped recycle device with its outer or upper end in peripheral contact with the reactor wall and conduits for the upflow of gas and liquid penetrating the device and extending above the reactor liquid level; a central conduit returns the liquid to the recycle pump. Also, the conduits through which liquids and gases pass are positioned such that the lower portion of the conduit for liquids extends into the liquid, whereas the conduit for gases is above the liquid interface. The upper ends of both conduits terminate in the vapor space of the reactor.

Experience has shown that this arrangement with the fluid conduits terminating above the liquid level does not provide effective separation and actually contributes to gas entrainment in the recycled liquid. Thus, there has been a distinct need for an improved means for quickly and efficiently separating gas from liquid being recycled in such a catalytic reaction step, so that the throughput and efficiency of the entire hydrogenation reaction process can be significantly increased.

SUMMARY OF INVENTION

Surprisingly, it has now been found that the foregoing disadvantages of the prior art can be avoided, and the superficial gas velocity for ebullated bed processes substantially increased by an improved reactor design with a new recycle device and its method of operation.

The invention provides a continuous reaction process for treating viscous liquids, wherein the feedstock liquid or liquid-solids slurry is contacted with a reaction gas at elevated temperature and pressure conditions in an ebullated bed vertical reaction zone. In accordance with the invention, liquid or a liquid-solids slurry is introduced into a lower portion of the reaction zone at an upward flow rate sufficient to produce random motion of contact particles in the reaction zone. The entering gas has a superficial linear upward velocity greater than about 0.02 ft/sec (0.65 cm/sec). The ebullated bed of contact material is maintained in random motion as described in U.S. Pat. No. Re 25,770, the disclosure of which is incorporated by reference, in the reaction zone and is in volumetric expansion of between about 10–200% greater than in a settled condition. Treated liquid feedstock and gas flow upwardly from the reaction zone without substantial contact particle entrainment into an adjacent phase separation zone, and through upwardly directed fluid conduit means having fluid intake means operatively disposed above the reaction zone to receive treated liquid and gas in constricted flow. Fluid from the upwardly directed fluid conduit means is discharged at an upper portion of the phase separation zone, but below the reactor liquid level so as to accomplish substantial disengagement of the gas from the liquid, and a major portion of the treated vapor-reduced liquid is collected and recycled from the lower level of the phase separation zone through a downward directed fluid conduit means having an enlarged upper end. The remaining portion of the treated liquid and gas from the phase separation zone is withdrawn above the upwardly-directed fluid conduit means.

The reactor vessel is divided into two parts, a lower reaction zone and an upper phase separation zone. The feedstock and gas are introduced into the lower end of the reaction zone, which contains an ebullated bed of particulate solids or preferably a catalyst material, and rise uniformly through the reaction zone to the phase separation zone which contains an improved phase separation-collection apparatus. This apparatus provides effective separation of the vapor portion from the rising liquid-gas mixture, so that a substantially vapor-free liquid can be collected and returned through a downcomer conduit to a circulating pump for recycle through the ebullated bed reaction zone to maintain the desired ebullated bed expansion therein.

The separation-collection apparatus has an enlarged upper portion and is preferably conical or frusto-conical in shape, but may be of any shape, such as cylindrical, and has a lower portion comprising a liquid downcomer conduit leading to a recycle pump in the bottom of the reactor. The fluid intake means, which receive the liquid and gas in constricted flow, comprise at least two conduits in fluid communication between the reaction section and the upper portion of the separation-collection apparatus.

The lower inlet and upper outlet ends of a portion of the fluid conduits are preferably located above the lower inlet and upper outlet ends of each of the remaining fluid conduits, however, the lower and upper ends may be at the same level. In addition, the liquid level in the reactor is maintained above all of the fluid conduits.

It is a general object of this invention to provide an improved process and apparatus for fluidized catalytic bed reaction of liquid and gaseous materials.

It is another object of this invention to provide a process wherein the efficiency of a catalytic hydrogenation process employing an ebullated catalyst bed reaction is significantly increased.

It is still another object of this invention to provide a means for efficiently separating hydrogen and other light hydrocarbon gases from hydrocarbon liquids being hydrogenated and recycled in an ebullated catalyst bed system.

It is a further object of this invention to provide a means for efficiently separating upflowing gases and liquids in a moving particulate mass wherein the recycled liquid portion is required to reverse direction from generally vertically upward to vertically downward.

Still other objects will appear from the more detailed description of this invention which follows.

DESCRIPTION OF THE DRAWINGS

FIG. 1 is a sectional elevation view of a reaction vessel containing a simple phase separation-collection apparatus suitable for the process of this invention.

FIG. 5 is an elevation sectional view of an alternative separation-collection apparatus for which the conical portion is extended to contact the reactor inner wall.

FIG. 6 is an elevation sectional view of an experimental phase separation-liquid collection apparatus.

DETAILED DESCRIPTION OF INVENTION

Figure 3:
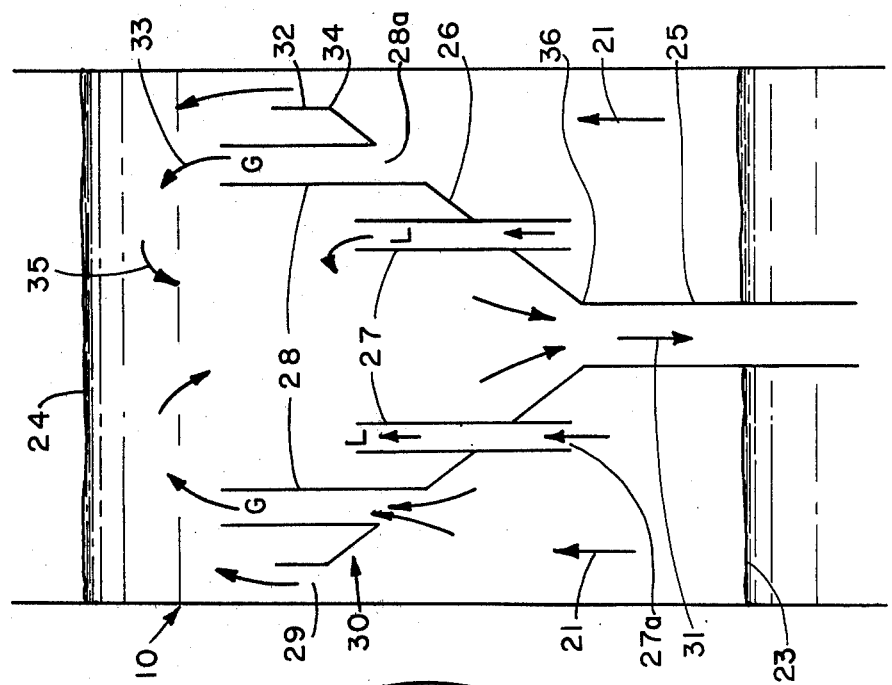
FIG. 3 is an enlarged elevation view showing an alternative separation-collection apparatus for which the gas and liquid-rich conduits exit at a level above the annular passageway exit.

While the invention is applicable to any process of chemically reacting liquid and gasiform materials in the presense of a mass of solid contact particles, the invention will be described with particular reference to the liquefaction of coal and upgrading of heavy oil, as generally disclosed in U.S. Pat. No. Re 25,770.

The reactor vessel is divided into two parts, a lower reaction zone and an upper phase separation zone. The feed liquid and gas are introduced into the lower end of the reaction zone, which contains a bed of particulate solids, for example, perferably a catalyst material, and rise uniformly through the reaction zone, thereby expanding the catalyst mass to form what has come to be called an ebullated bed. Liquid and gas pass to the phase separation zone which contains an improved phase separation-collection apparatus. This apparatus provides effective separation of the vaporous and gaseous portion of the rising liquid-gas mixture, so that a substantially vapor-free liquid portion can be collected and returned through a downcomer conduit to a circulating means such as a pump for recycling liquid through the ebullated bed reaction zone to maintain the desired ebullated bed expansion therein.

The separation-collection apparatus has an enlarged upper portion; is preferably conical or frusto-conical in shape, but may be of any shape, such as cylindrical; and is connected to a liquid downcomer conduit leading to the recycle means in the bottom of the reactor. The fluid intake means receive the liquid and gas in constricted flow, which comprise a plurality of conduits in fluid communication above and below the separation-collection apparatus.

In the most preferred embodiment, the lower inlet end of a portion of the fluid intake conduits is located above the lower inlet end of the remaining fluid intake conduits, preferably at least two (2) inches above. When the inlet ends are so positioned, the higher conduits are herein called gas-rich fluid conduits, whereas the lower conduits are called liquid-rich fluid conduits. That is, the gas-rich fluid conduits receive a fluid that is richer in gas than the liquid-rich fluid conduits. The upper outlet end of each gas-rich fluid conduit or passageway is located above the upper end of each liquid-rich conduit, preferably at least two (2) inches above. In addition, it is critical that the liquid level in the reactor is maintained above the uppermost end of the gas-rich fluid conduit or passageway, preferably at least two (2) inches above.

It should be noted that it is within the scope of the invention for the intake and outlet ends of the fluid conduits to be at the same level, however, the gas concentration passing through each fluid intake conduit will be approximately equal. The enlarged surface of the separation-collection apparatus is generally inclined upwardly from the recycle conduit and may be extended outwardly to peripherally contact the inner wall of the reactor. If the separator-collector is not extended to the inner wall of the reactor, a generally annular space is formed between an outer cylindrical portion of the separator-collector and the reactor wall, which acts as a gas-rich fluid intake conduit.

The total cross-sectional area of both gas-rich and liquid-rich conduits should not exceed about 50%, preferably between 10% and 40%, of the reactor cross-sectional area. The relative proportion of cross-sectional area of liquid-rich and gas-rich conduits is not particularly critical and will vary depending on the nature of the liquid. The total cross-sectional area of gas-rich risers is preferably between about 5% and 30% of the reactor internal cross-sectional area; the total cross-sectional area of the liquid-rich riser conduits should preferably be between about 5% and 30% of the reactor cross-sectional area. Each gas-rich and liquid-rich riser conduit should have a minimum transverse dimension sufficient to avoid plugging, preferably at least about 0.25 inch (0.64 cm), and most preferably between about 0.50 and 12 inches (1.27-30.5 cm) in transverse dimension. The conduits should preferably be circular in cross-section, but may be made non-circular, such as square, hexagonal, annular or oval-shaped, if desired.

It is a critical feature of this invention that the upflowing liquid-gas mixture rising from the reaction zone passes through the fluid intake conduits of the separation-collection apparatus and that all conduits are below the reactor liquid level. After passage through the separation-collection apparatus, the resulting gas portion then rises to the vapor space above the phase separation zone, and a portion of liquid is collected and returned through a downcomer conduit for recycle to the reaction zone, while the remaining liquid portion is withdrawn from the reactor as liquid effluent. The recycled liquid passes through the downcomer to a circulating pump, then passes through a liquid-gas distributor means, together with fresh liquid and gas feed to maintain uniform upward fluid flow through the ebullated catalyst bed. The liquid and vapor effluent can be withdrawn separately from the upper portion of the reactor, in which case the liquid would be drawn from a point in the apparatus essentially vapor free. The internal separation of liquids from gases by this invention will obviate the need for utilizing an external phase separator downstream of the reactor. If desired, liquid and vapor portions may be withdrawn together through a single conduit extending into the reactor to a point above the top of the separation-collection apparatus, but at the liquid-gas interface.

The invention is further illustrated by reference to FIG. 1. Reaction vessel 10 is disposed with its long axis in a vertical position and is generally of a circular cross-section, although the exact shape of the cross-section is not critical. Although this FIG. 1 drawing is schematic in order to show its various features, it will be understood that the reactor is constructed in such a fashion and from such materials that it is suitable for reacting liquids, liquid-solid slurries, solids and gases at elevated temperatures and pressures and in a preferred embodiment for treating hydrocarbon liquids and coal-oil slurries with hydrogen at high pressures and high temperatures, e.g. 100-5000 psi and 300°-1500° F. The reactor 10 is fitted with a suitable inlet conduit 12 for feeding heavy oil, or a mixture of oil with small particles of coal, and a hydrogen-containing gas. Outlet conduits are located in the upper portion of reactor 10, outlet 14 being designed to withdraw vapor and liquid, and outlet 16 to withdraw mainly liquid product, if desired. The reactor also may contain means for introducing and withdrawing catalyst particles, which are shown schematically as inlet 15 and outlet 17.

Feedstock, such as oil or oil slurried with coal particles, is introduced through line 11, while hydrogen-containing gas is introduced through line 13, and may be combined with the feedstock and fed into reactor 10 through inlet 12 in the bottom of the reactor. The incoming fluid passes through grid tray 18 containing suitable fluid distribution means. In this drawing, bubble caps 19 are shown as the fluid distribution means, but it is to be understood that any suitable device known in the prior art which will serve to uniformly distribute the fluid coming from inlet 12 over the entire cross-sectional area of reactor 10 may be utilized.

The mixture of liquid and gas flows upwardly, and the catalyst particles are thereby provided with an ebullated movement by the gas flow and the liquid flow delivered by recycle pump 20. If desired, recirculated oil may also be fed into reactor 10 by an external recycle pump. The upward liquid flow delivered by this recycle pump is sufficient to cause the mass of catalyst particles in bed 22 to expand by at least 10% and usually by 20-200%, thus permitting gas and liquid flow as generally shown by direction arrow 21 through reactor 10 at a steady rate. Due to the upwardly directed flow provided by the pump and the downward forces provided by gravity, the catalyst bed particles will reach an upward level of travel or ebullation while the lighter liquid and gas will continue to move upward beyond that level. In this drawing, the upper level of catalyst or catalyst interface is generally shown at 23, and the reaction zone extends from approximately grid tray 18 to level 23. Catalyst particles in bed 22 in this reaction zone move in random motion and are generally uniformly distributed through this entire zone in reactor 10.

Substantially no catalyst particles rise above catalyst interface 23. The volume above the catalyst interface is filled with liquid and entrained gas or vapor up to the liquid-gas interface which is shown as level 24. The upper portion of the reactor is the phase-separation zone in which the liquid and gas are separated in the separation-collection apparatus 30 to collect and recycle through downcomer 25 a liquid with a substantially reduced gas and vapor content. A substantially liquid product may be withdrawn separately from gas and vapor through outlet 16, in which event conduit 14 terminates in the vapor space and is used to withdraw vapor only, or gases, vapors, and liquids may be withdrawn together.

The upper portion of downcomer 25 is enlarged and is preferably inverted frusto-conical in shape, the inclined portion of which is surface 26. Annular space 29, between the interior wall of reactor 10 and phase separator 30, permits fluid flow therebetween. A plurality of vertically directed conduits 27 and 28 intersect surface 26, providing fluid communication between the reaction zone and phase separator-collector apparatus. Gas-entrained fluid moves upwardly through the phase-separation zone, and upon leaving the upper ends of these conduits, the liquid portion reverses direction and flows downward to and through downcomer 25 in the direction of arrow 31 to the inlet of pump 20 and thereby is recycled through the lower portion of reactor 10. Gases and vapors which are separated from the liquid rise to the liquid-gas interface 24 and are collected in the upper portion of reactor 10 and removed through outlet conduit 14. The gases and vapors removed at this point are treated using conventional means to recover as much hydrogen as possible for recycle into the gas feed inlet 13.

Figure 2:
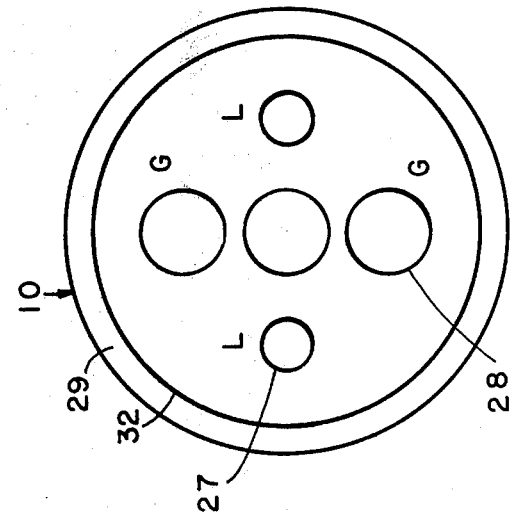
FIG. 2 is a plan view of the separation-collection apparatus of FIG. 1 showing location of the gas-rich and liquid-rich riser conduits.

FIG. 2 shows a cross-sectional plan view of the FIG. 1 configuration, with both liquid-rich conduits 27 and gas-rich conduits 28 being located at the same diameter and surrounded by annular-shaped gas-rich passageway 29. While this configuration shows five (5) conduits, it will be understood that as few as two (2), and as many as will accommodate the above-noted relationships between cross-sectional area of the conduits and reactor, may be utilized.

Figure 4:
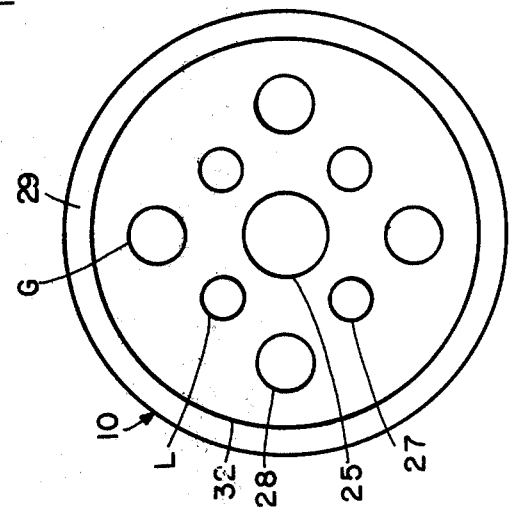
FIG. 4 is a plan view of the separation-collection apparatus of FIG. 3 showing an increased number of gas-rich and liquid-rich riser conduits.

The liquid-gas separation accomplished in accordance with this invention will be better understood by reference to FIGS. 3 and 4, which show enlarged views of separation-collection apparatus 30 and fluid intake conduits 27 and 28, and 29. In FIG. 3, it may be seen that the fluid rises above catalyst level 23 to the lower side of separation-collection apparatus 30, which meets lower inclined surface 26 of the separation-collection apparatus and has an increasing diameter with increasing height. Gas bubbles entrained in the liquid will tend to rise within the liquid because of their buoyancy, and thus will travel upwardly along the inclined under surface of apparatus 30 until the inlet to one of the conduits is reached, which will permit the gas bubble and the liquid surrounding it to selectively continue their upward movement. In accordance with this invention, conduits 27 and 28 preferably have both inlet and outlet ends located at different vertical levels within reactor 10. It has been determined that if the inlet end of a conduit (gas-rich conduit) is above the inlet of other conduits (liquid-rich conduits), and preferably at inclined surface 26, the fluid which flows through that conduit tends to be richer in gas than the fluid which flows through conduits having inlet ends below conical portion 26. Thus, it has been found that by positioning the inlet ends of the fluid conduits at different levels, one can effect an increased concentration of liquid in those conduits having inlets at lower levels and an increased concentration of gas in those conduits or passageways having their inlets at higher levels, which significantly increases the separation of liquid from vapor and permits increased gas velocities through the reactor. Similarly, it has also been found that if a gas-rich conduit has its outlet at a higher level in reactor 10 than the outlet of a conduit which is rich in liquid, the gas bubbles will tend to continue in their upward movement as shown at arrows 33 and not be diverted in the direction of liquid flow as shown at arrows 35 into a downward direction and into downcomer 25.

In FIG. 3, the conduits which serve as passageways for gas-rich fluid are noted as 28, having inlet ends 28a at inclined surface 26 of apparatus 30 and outlet ends 28b at a higher elevation. While it is preferred that the conduit for gas-rich fluids not extend below the inclined surface of the apparatus, such is within the scope of this invention; however, the most preferred embodiment has the inlet end higher relative to the conduit for receiving liquid-rich fluids. Similarly, conduits which serve to transport liquid-rich fluid and have a low concentration of gas are noted as 27, with inlet ends 27a at a level below conical surface 26 of apparatus 30 and outlet ends 27b also at a low elevation. Accordingly, annular-shaped conduit 29 surrounding apparatus 30 will also selectively pass gas-rich fluid and will function as a gas-rich fluid conduit 28.

FIG. 4 shows a cross-sectional plan view of the phase separation-collection apparatus of FIG. 3, having an increased number of liquid-rich fluid conduits 27 and gas-rich conduits 28 located outwardly therefrom, and surrounded by annular-shaped gas-rich passageway 29. In FIG. 4, there may be seen a preferred distribution of different conduits in the plan view of reactor 10. Each conduit labeled "G" is one which has its inlet end at the lower surface of apparatus 26 and its outlet end at a higher elevation, and thus is similar to conduit 28. Each conduit labelled "L" is one which has its inlet end at an elevation below the surface of conical portion 26 and its outlet end at a low elevation, similar to conduit 27. It is usually preferable to have a larger proportion of "G" conduits located nearer the outer wall of reactor 10 and a larger proportion of "L" conduits located nearer the center of reactor 10 near liquid downcomer 25.

The general size relationships for the cross-sectional areas of liquid-rich conduits 27 and gas-rich conduits 28 in FIGS. 1-4 will vary depending upon the nature of the liquid, which can be readiy determined by one skilled in the art. The cross-sectional area of downcomer 25 need only be sufficient to return the recycled liquid at low pressure drop to the pump suction, and may be between 1 to 10 percent of the cross-sectional area of reactor 10. The number of fluid conduits 27 and 28 which may be employed in a single reactor is not critical. If the transverse dimension or diameter of the conduits is too small, there is a possibility of plugging by particles of coal solids within the conduit. It is believed preferable to employ as many conduits as necessary to have good mechanical strength and good flow districution with a minimum of fluid cross flow within the apparatus. The proportion of conduits G to L as shown in FIG. 2 (i.e. the proportion of those carrying gas-rich fluid to those carrying liquid-rich fluid) will depend upon the amount of total gas in the reactor.

The liquid-rich and vapor-rich fluid conduits may both be located on the same radius or diameter, as shown in FIGS. 1-2, or they may each be located at different diameters as shown in FIGS. 3-4.

FIG. 5 shows in an alternative embodiment that the enlarged conical portion of the separation-collection apparatus may be extended to be in peripheral contact with the reactor inner wall, thereby eliminating the annular space used for upflow of vapor-rich fluid. The numbers shown correspond to the description in FIG. 3.

The different levels of elevation for the inlet and outlet ends of conduits 27 and 28 in FIGS. 1, 3, and 5 are not particularly critical. However, it is preferred that the inlet ends of gas-rich conduits 28 intersect the surface of inclined, enlarged portion 26 and not extend below that surface. The inlet ends of liquid-rich conduits 27 must be below the inclined surface, in order to avoid collecting any more gas than happens to flow directly into the conduit open end.

The upper ends of conduits 27 and 28 are intended to be placed at convenient locations to provide the maximum opportunity for gas to separate from upflowing liquid-gas mixture and for the liquid to be collected and returned through downcomer 25 to recycle pump 20. With respect to liquid-rich conduits 27, it is necessary that their upper outlet end be located below the upper outlet end of gas-rich conduit 28 or passageway 29. Both conduits must be below liquid interface 24. The upper end of gas-rich conduits 28 should be at least about 2 inches (5.1 cm) below liquid-gas interface 24 and may preferably be about 6 inches to 6 feet below that interface. If conduit 28 extends above interface 24, gas will be entrained in the turbulent liquid and carried downwardly into downcomer 25 to recycle pump 20. The elevation of the outlet ends of gas-rich conduits 28 should be sufficiently above corresponding outlet ends of liquid-rich conduits 27 so as to be relatively unaffected by the liquid flow from conduits 27, which is reversing direction to flow downwardly into downcomer 25.

One of the parameters for operation of a hydrogenation reaction process is the superficial gas velocity, calculated as a linear velocity of gas flowing vertically upward through the empty reaction zone. Before this invention, the superficial gas velocity was maintained at an undesirably low level in order to achieve a satisfactory degree of liquid-gas separation and minimum amount of gas entrainment in the liquid being recycled through the reactor. Specifically, a superficial gas velocity of about 0.08–0.10 feet/second (2.4–3.1 cm/sec) was found to be the approximate upper limit in coal hydrogenation processes without causing excessive gas entrainment in the recycle liquid and instability of the ebullated bed. It has now been found that with the improved gas-liquid separation achieved by this invention, such superficial gas velocity can be increased to about 0.15–0.20 feet/second (4.6–6.1 cm/sec) without causing excessive gas entrainment in the recycle liquid and instability of the ebullated bed. This permits a significant increase in reactor catalyst bed stability. In terms of gas concentration, the present process is able to produce liquid which can be recycled through downcomer 25 containing less than 8% gas by volume. The procedures encountered in the past, wherein the superficial gas velocity was as low as 0.08 feet/sec., produced liquid for recycle to the pump containing as much as 20% gas by volume.

In the hydroconversion of oil, the maximum superficial gas velocity that has been heretofore attained in the reactor is 0.20 ft/sec, whereas by the use of the instant invention, the maximum superficial gas velocity that will result in an operable process can be increased to greater than 0.26 ft/sec.

It will be understood by one skilled in the art that the maximum amount of gas entrained in the recycle fluid which will produce a stable ebullated bed will vary with the density and viscosity of the reactor fluid, as well as the density of the contact material.

Figure 7:
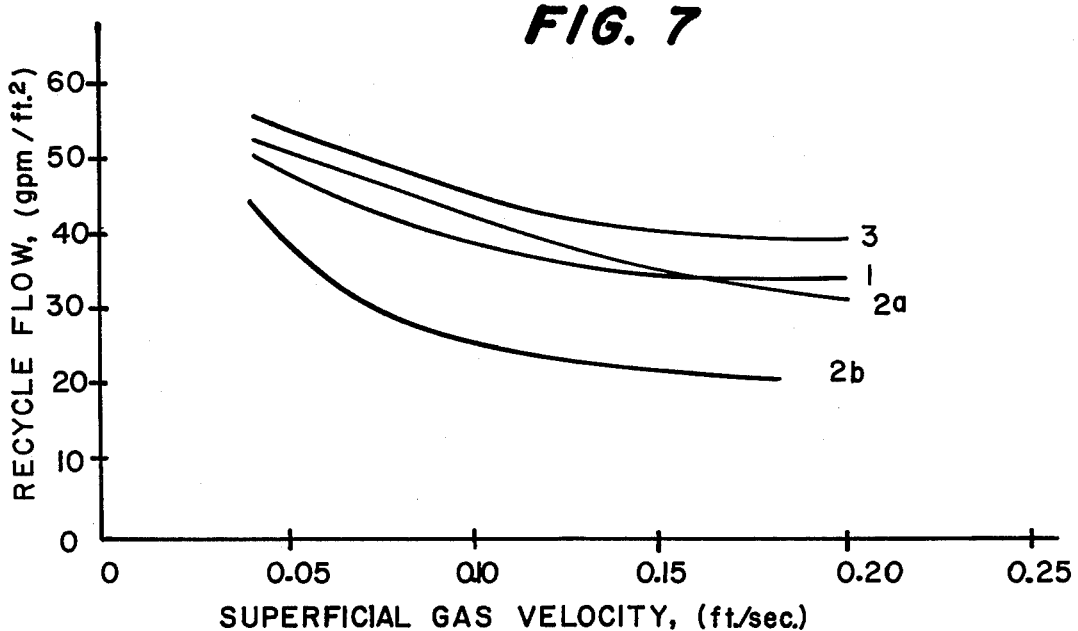
FIG. 7 is a graph showing recycle pump flow plotted versus superficial upward gas velocity in the rising liquid.
Figure 8:
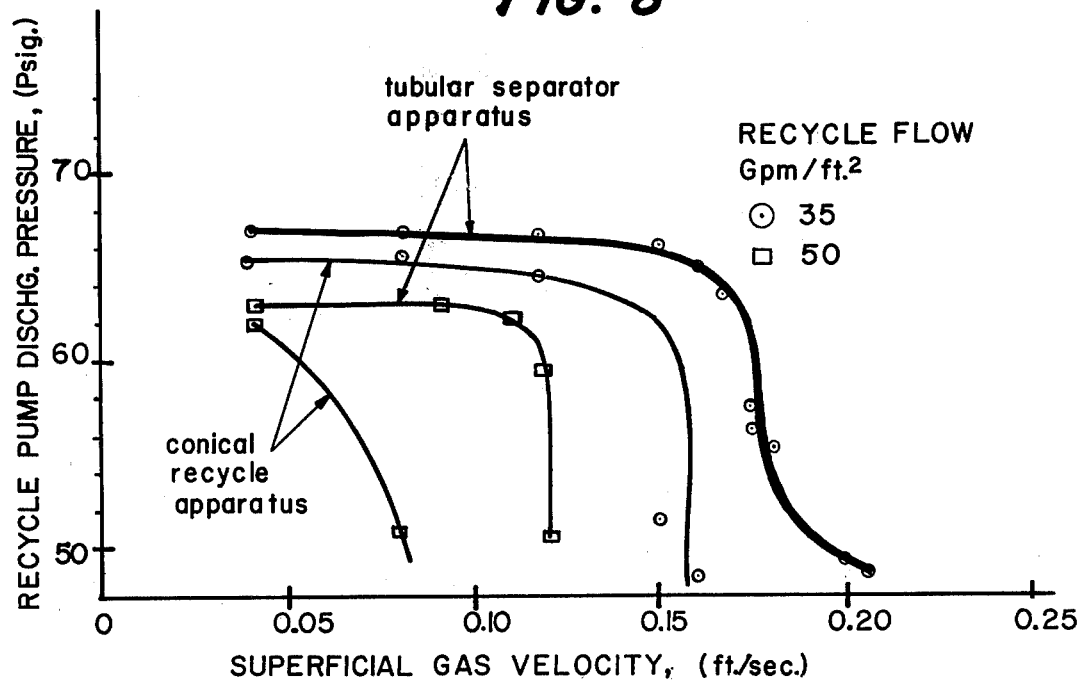
FIG. 8 is a graph showing similar comparative test results of two larger diameter separation-collection apparatuses.

The invention will be further illustrated and described by the following examples comparing the operating results of various apparatus configurations and embodiments. In order to compare the performance of separation-collection apparatuses of differing design, it is necessary to determine at various superficial gas velocities how much gas is entrained in the recycle fluid. Relative amounts of gas entrained in the recycle liquid can be measured by monitoring the recycle pump discharge pressure at a constant recycle flow measured in gallons per minute per square foot of reactor cross-sectional area (gpm/ft$^2$). As the gas velocity is increased, the volume percent of gas in the recycle liquid flow increases up to a maximum. Beyond the maximum, an unstable recycle flow results, which leads to ebullated bed instability and process inoperability. As the amount of gas in recycle stream increases, pump and pressure discharge decreases. Likewise, the recycle flow rate also decreases. Therefore, FIG. 7 is a graph plotting flow rate against gas velocity. FIG. 8 plots discharge pressure against gas velocity.

Examples 1 through 3 were conducted in a glass tube (simulated reactor) 6 inches in diameter and 10 feet in length, at near ambient pressure and temperature conditions, using kerosene and air to simulate the reaction fluids, and using typical particulate cobalt molybdenum catalyst of 1/16" diameter extrudates.

EXAMPLE 1

A conical-shaped separation-collection device similar to Guzman—U.S. Pat. No. 3,124,518 and having cross-sectional area about 45% that of the glass tube was first tested at superficial upward gas velocities ranging from 0 to 0.18 ft/sec. Results shown in FIG. 7, Curve 1, indicate that excessive gas was entrained in the recycle pump suction liquid at gas velocities above about 0.08 ft/sec, so that the ebullated catalyst bed operation became unstable in operation.

EXAMPLE 2

A separation-collection apparatus having two 2-inch diameter tubular-shaped risers for fluid upflow so that the recycle apparatus is effectively extended to the wall of the reactor, as shown by FIG. 6, was constructed and tested. The liquid level was maintained first 5 inches above the upper end of the fluid intake conduits (Curve 2(a)). Another run was made with the liquid level 4 inches below the upper end of the fluid intake conduits (Curve 2(b)). Results of these tests in the glass-tube simulated reactor are also shown in FIG. 7, comparing the recycle pump flow pressure versus superficial upward gas velocity. It is evident that operation of the tubular-type recycle apparatus having the reactor liquid level and fluid take-off point located above the tubular risers (Curve 2a), is superior to the prior art conical-shaped apparatus design of Example 1, as it provides generally increased pump recycle-liquid flow and discharge pressure, thereby providing more stable catalyst bed ebullation. However, the tubular-type collection apparatus, having the reactor-liquid level maintained below the upper end of the tubular risers (Curve 2b), was clearly inferior in performance to the other two apparatus configurations.

EXAMPLE 3

A separation-collection apparatus configuration, as generally shown in FIG. 1, was constructed and tested in the 6-inch diameter glass-tube simulated reactor, with the liquid level and fluid withdrawal point being maintained at least about 2 inches above the lip of the apparatus. Specifically, the FIG. 1-type recycle cup had a 0.22 inch wide annular conduit between the separation-collection apparatus and glass-tube wall and a 2-inch diameter gas-rich tubular riser located above a 2-inch diameter liquid-rich riser. Comparison results for this recycle apparatus are also shown in FIG. 7 and indicate that the improved tubular design apparatus (Curve 3) provides performance superior to both other apparatus configurations tested, as it provided both higher recycle liquid flow rate and pump discharge pressures at all superficial gas velocities up to about 0.18 ft/sec than for either (a) the conventional conical-shaped recycle apparatus or (b) the tubular-type recycle apparatus with tubular risers extending above the liquid level per FIG. 6.

EXAMPLE 4

Comparison runs were performed in a 6-inch diameter, 22 ft. long ebullated catalytic bed reactor processing about 250 lb/hr Illinois No. 6 coal slurried with recycle oil at elevated pressure and temperature conditions. The first run utilized in the reactor a conventional prior art phase separation-collection device similar to that in Example 1, and having cross-sectional area about 44% that of the reactor. Stable operation of the ebullated catalyst bed could not be achieved at superficial upward gas velocities exceeding about 0.07 ft/sec due to excessive entrained gas in the liquid to the recycle pump. Next, a phase separation-collection device similar to that illustrated in FIG. 1 and having an annular gas-rich conduit, one additional gas-rich fluid conduit, and one liquid-rich fluid conduit was installed in the reactor and operated with the liquid level about 4 inches above the upper end of the gas-rich conduit. As a percentage of reactor cross-sectional area, the cross-sectional area of the annular conduit around the apparatus was about 14%, that of the gas-rich conduit about 7%, and that of the liquid-rich conduit about 10%, thus making the total cross-sectional area of all fluid carrying conduits and passageways about 31% of the reactor cross-sectional area. Using this apparatus, it was possible to increase the superficial gas velocity in the reactor to 0.18 ft/sec before instability of the ebullated bed was encountered due to entrained gas in the recycled liquid. Compararative results are given in Table 1.

TABLE 1

| | Prior Art | Invention |
|---|---|---|
| Reactor Feed | Illinois No. 6 Coal in Oil Slurry | |
| Catalyst Used | 1/16" Diameter Cobalt-Molybdenum Extrudates | |
| Dry Coal Feed Rate, Lb/Hr/Ft$^3$ | 65 | 60 |
| Reactor Conditions | | |
| Temperature, degrees F. | 848–850 | 825–850 |
| Pressure, psig | 2700 | 2500 |
| Coal/Slurry Oil Weight Ratio | 0.25 | 0.25 |
| H$_2$Gas Recirculation Rate, SCF/Lb Dry Coal | 15.7 | 15 |
| Maximum Superficial Gas Velocity Achieved, Ft/Sec | 0.07 | 0.18 |
| Continuous Operation Duration, Hours | 534 | 475 |

EXAMPLE 5

A larger phase separation-collection apparatus, having multiple riser tubes as generally illustrated by FIGS. 3 and 4, was subsequently constructed and tested in a 5-foot diameter model reactor, using nitrogen and kerosene at near ambient conditions to simulate operation with hydrogen and hydrocarbon liquids at elevated temperature and pressure conditions. The separation-collection apparatus utilized an annular conduit 0.81 inches wide and had six 8.75-inch diameter gas-rich riser conduits and six 7.25-inch diameter liquid-rich riser conduits located inward from and below the gas-rich risers. The total cross-sectional area for the gas-rich conduits and liquid-rich conduits was about 20% and 10%, respectively, of the reactor cross-sectional area. A large prior art conical-shaped recycle device, similar to that of Example 1 and having a cross-sectional area about 75% that of the reactor, was also constructed and tested in this same facililty for comparison. Results of these comparison tests at liquid recycle flow rates of 35 and 50 gpm/ft$^2$ are presented in FIG. 8.

It is evident that the tubular design separation-collection apparatus having the reactor-liquid level maintained above the uppermost fluid passageway or riser conduit is superior to the conventional conical-shaped recycle apparatus configuration at each liquid-recycle flow rate tested, in that higher pump recycle-flow rates and discharge pressures were sustained at each superficial upward gas velocity. This indicates that for the present invention less gas was being entrained in the liquid being recirculated through the simulated reactor. Accordingly, the less gas being entrained in the recycle pump suction liquid, the more stable will be the catalyst bed ebullation.

Although the invention has been described in considerable detail with reference to certain preferred embodiments thereof, it will be understood that variations and modifications in the configurations can be made within the spirit and scope of the invention, as described hereinabove and as defined in the appended claims.

What is claimed is:

1. A continuous liquid phase reaction process for chemically treating fluent feedstocks, wherein the material is contacted with a reactive gas under conditions of elevated temperature and pressure in the presence of contact particles in a vertical reaction zone, which comprises:

(a) introducing the gas and feedstock into the lower portion of the reaction zone at an upward flow rate sufficient to produce random motion of contact particles in the reaction zone, the entering gas having a superficial linear velocity greater than about 0.02 ft/sec. (0.65 cm/sec.);

(b) maintaining the contact particles in the reaction zone in a volumetric expansion about 10–200% greater than in a settled condition, while chemically reacting the feedstock material with the gas;

(c) flowing the treated feedstock material and gas upwardly from the reaction zone without substantial contact particle entrainment into an adjacent phase-separation zone, the upper portion of the phase separation zone being in fluid communication with the lower portion of the phase separation zone through fluid conduit means, comprising a plurality of conduits, a portion of which are operatively disposed in the phase-separation zone such that the lower inlet and upper outlet ends are each respectively at a higher elevation than the corresponding inlet and outlet ends of the remaining conduits to selectively receive treated liquid and gas in constricted flow;

(d) maintaining the liquid level in the phase-separation zone above the outlet ends of the fluid conduit means;

(e) recycling to the reaction zone a portion of the treated material by withdrawing recycle liquid from the phase-separation zone downwardly through a downwardly directed fluid conduit means, having an enlarged upper end; and (f) withdrawing a portion of the treated hydrocarbon material from the phase-separation zone.

2. The process of claim 1, wherein the total cross-sectional area of the higher conduits is 5 to 30% of the reactor total cross-sectional area; the cross-sectional area of the remaining conduits is 5 to 30% of the reactor total cross-sectional area; and the total cross-sectional area of the fluid intake means is less than 50% of the reactor cross-sectional area.

3. The process of claim 1, wherein the feedstock liquid comprises a hydrocarbon oil.

4. The process of claim 1, wherein the feedstock liquid comprises a fluent slurry, hydrocarbon oil, and solid carbonaceous materials selected from the group consisting of coal, tar sands, and lignite.

5. The process of claim 2, wherein the downwardly directed fluid conduit means comprise an inverted frusto-conical partition.

6. The process of claims 3 or 4, wherein the contact material is catalytic and the reactive gas contains hydrogen.

7. In a continuous process for treating fluent hydrocarbon feedstocks with a hydrogen-containing gas at elevated temperatures and pressures in the presence of a bed of particulate solid contacting agent, comprising introducing the hydrogen-containing gas and feedstock into the lower end of a generally vertical reaction vessel containing solid contacting agent at sufficient velocity whereby the contacting agent is placed in random motion within the fluent hydrocarbon and is expanded to a volume greater than its static volume, wherein the mixture of feedstock, gas, and contacting agent constitutes a turbulent zone, the upper portion of which is defined by a liquid-solids interface, above which consists essentially of a zone substantially free of solids, and wherein there exists a liquid-gaseous interface above the solids-free zone above which only a gaseous phase exists, and wherein liquid is recycled from above the liquid-solid interface to the lower end of the turbulent zone and treated hydrocarbon material is removed from the upper portion of the vessel, the improvement which comprises:
(a) flowing the treated feedstock and gas upwardly through fluid conduit means and having fluid intake means operatively disposed above the liquid-solids interface to selectively receive treated liquid and gas in constricted flow, the fluid conduits having an outlet end below the liquid-gas interface;
(b) recycling a gaseous gas-reduced liquid from the solids-free zone through a downwardly directed fluid conduit means having an enlarged upper end forming an inner gas-disengaging section.

8. A reactor comprising:
(a) a generally vertical vessel;
(b) means for introducing liquid and gasiform material into the lower portion of the vessel;
(c) a generally vertical recycle conduit internally disposed within the vessel, having an enlarged upper end in fluid communication with the upper portion of the reactor and a lower end in fluid communication with the lower portion of the vessel through a means for recirculation;
(d) a plurality of vertical conduit means adapted for receiving liquid and gas, comprising less than 50% of the vessel total cross-sectional area, in fluid communication above and below the enlarged upper portion of the recycle conduit, a portion of the conduit means having a lower inlet end and upper outlet end, respectively, operatively disposed above the inlet and outlet ends of the remaining conduit means.

9. The reactor of claim 8, wherein the enlarged portion of the recycle conduit is in peripheral contact with the wall of the vessel.

10. The reactor of claim 8, wherein the enlarged end of the recycle conduit is inverted frusto-conical in shape.

11. A reactor comprising:
(a) a generally vertical vessel;
(b) means for introducing liquid and gasiform material into the lower portion of the vessel;
(c) A generally vertical conduit internally disposed within the vessel, having an enlarged upper end in fluid communication with the upper portion of the reactor and a lower end in fluid communication with the lower portion of the vessel through a means for recirculation; and
(d) a plurality of vertical conduit means adapted for receiving liquid and gas, comprising less than 50% of the vessel total cross-sectional area, in fluid communication above and below the enlarged upper portion of the recycle conduit.

12. Reactor of claim 8 or claim 11 wherein the enlarged portion of the recycle conduit is inclined upwardly and outwardly toward the inner wall of the reactor.

13. The reactor of claim 8 or claim 11, wherein the total cross-sectional area of the higher conduits is 5 to 30% of the reactor total cross-sectional area and the lower conduits have a total cross-section area between 5 to 30%, and the total cross-section area of the higher and lower conduits is between 10 and 40% of the reactor cross-sectional area.

14. The reactor of claim 11, wherein a portion of the vertical conduit means have inlets at a higher elevation than the remaining conduits and the outlet ends are at the same elevation.

15. The reactor of claim 14, wherein the inlet ends of each vertical conduit are at the same elevation.

* * * * *